(12) United States Patent
Ganesan et al.

(10) Patent No.: US 11,221,952 B1
(45) Date of Patent: Jan. 11, 2022

(54) AGGREGATED CACHE SUPPORTING DYNAMIC RATIOS IN A VSAN ARCHITECTURE

(71) Applicant: Dell Products, L.P., Round Rock, TX (US)

(72) Inventors: Vaideeswaran Ganesan, Bangalore (IN); Deepaganesh Paulraj, Bangalrore (IN); Vinod P S, Bangalore (IN); Ankit Singh, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/984,566

(22) Filed: Aug. 4, 2020

(51) Int. Cl.
   *G06F 12/0806* (2016.01)
   *H04L 29/08* (2006.01)

(52) U.S. Cl.
   CPC ...... *G06F 12/0806* (2013.01); *H04L 67/1097* (2013.01); *G06F 2212/1021* (2013.01); *G06F 2212/152* (2013.01)

(58) Field of Classification Search
   CPC .................................................. G06F 12/0806
   USPC ........................................................ 711/119
   See application file for complete search history.

(56) References Cited

U.S. PATENT DOCUMENTS

| 2015/0355700 | A1* | 12/2015 | Pusukuri | G06F 9/5011 713/323 |
| 2019/0042424 | A1* | 2/2019 | Nair | G06F 16/1748 |

* cited by examiner

*Primary Examiner* — Jae U Yu
(74) *Attorney, Agent, or Firm* — Fogarty LLP

(57) ABSTRACT

In vSAN (virtual Storage Area Network) systems, pooled storage resources may be organized into logical disk groups. One drive of a disk group may be designated for caching storage operations directed at the remaining drives of the disk group that provide permanent storage. Each cache drive is partitioned into an allocation for read operations and an allocation for write operations. Embodiments provide the vSAN system with use of virtual cache that is backed by the cache drives of each disk group in the vSAN system. Embodiments adjust the cache memory allocations for individual cache drives of each disk group, while utilizing the virtual cache that adheres to a fixed cache allocation ratio required by the vSAN system. The number and type of cache misses by each of the individual cache drives is monitored and used to adjust the sizes of the read and write cache allocations in each cache drive.

20 Claims, 4 Drawing Sheets

AGGREGATED CACHE SUPPORTING DYNAMIC RATIOS IN A VSAN ARCHITECTURE

FIELD

This disclosure relates generally to Information Handling Systems (IHSs), and more specifically, to IHSs supporting data storage systems.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Groups of IHSs may be housed within data centers. A data center may include a large number of IHSs, such as servers that are installed within a chassis and then stacked within slots provided by racks. In such data center configurations, resources may be pooled and shared by one or more IHSs. For instance, storage resources may be pooled and shared across a network fabric to form a storage area network (SAN). In some instances, the pooled storage resources of a SAN may be selected from a group of server IHSs that may be referred to as cluster. In addition to utilizing pooled resources, the software applications running on these server IHSs may operate within virtualized software environments that rely on abstractions of the underlying IHS hardware, thus allowing the hardware to be administered, and in some cases replaced, without affecting the operation of the software applications running in the virtualized environments. In some instances, data storage resources may be virtualized in this manner. In particular, a virtual storage area network (vSAN) utilizes a logical partition of the storage drives of a SAN, where the vSAN provides virtualized access to the pool of storage drives within the logical partition of SAN storage drives. In some instances, a vSAN may leverage this virtualization of storage drives by utilizing groups of storage drives, that may be referred to as disk groups, as a single, logical storage drive. In such instances, a disk group may include a dedicated storage drive that is configured as a read and write buffer for storage operations directed at the remaining drives of the disk group that provide permanent data storage.

SUMMARY

In various embodiments, methods are provided for operation in a vSAN (virtual Storage Area Network) system compromising a plurality of disk groups, wherein each disk group comprises a cache drive and a plurality of capacity storage drives. The methods may include: configuring a virtual cache that is backed by the cache drives of the plurality of disk groups; configuring the vSAN system for use of the virtual cache as a single logical cache in support of read and write operations directed at the plurality of disk groups of the vSAN system; monitoring cache misses by the cache drives of each of the disk groups during operation of the virtual cache by the vSAN system; detecting a number of cache misses above a first threshold in a first cache drive of a first disk group; and if the number of cache misses in the first cache drive surpasses the first threshold, adjusting a first allocation of the first cache drive for use in support of read operations and adjusting a second allocation of the first cache drive for use in support of write operations.

In additional method embodiments, the cache drive of each disk group comprises a solid-state drive and the plurality of capacity storage drives of each disk group comprise magnetic hard disk drives. In additional method embodiments, the vSAN system utilizes a fixed ratio of read cache allocation capacity and write cache allocation capacity. In additional method embodiments, the virtual cache adheres to the fixed ratio of cache allocation capacities. In additional method embodiments, the fixed cache allocation ratio utilized by the vSAN system comprises utilizing seventy percent of the cache capacity to support read operations and utilizing thirty percent of the cache capacity to support write operations. In additional method embodiments, the adjustments of the first allocation of the first cache drive in support of read operations comprises allocating no less than sixty percent of the cache capacity of the first cache drive for read operations. In additional method embodiments, the adjustments of the first allocation of the first cache drive in support of write operations comprises allocating no more than eighty percent of the cache capacity of the first cache drive for read operations. In additional embodiments, methods may further include, if the number of cache misses in the first cache drive surpasses the first threshold, adjusting a cache allocation ratio in a second cache drive of a second disk group to compensate for the adjustments to the cache allocations in the first cache drive. In additional method embodiments, the second cache drive of the second disk group is selected based on monitoring of cache drive misses in the second cache drive.

In various additional embodiments, vSAN (virtual Storage Area Network) systems include: a plurality of disk groups, wherein each disk group comprises a cache drive and a plurality of capacity storage drives; a virtual cache layer that is backed by the cache drives of the plurality of disk groups, wherein the virtual cache layer is configured for use by the vSAN system as a single logical cache in support of read and write operations directed at the plurality of disk groups; and a plurality of storage controllers configured to: monitor cache misses by the cache drives of each of the disk groups during operation of the virtual cache by the vSAN system; detect a number of cache misses above a first threshold in a first cache drive of a first disk group; and if the number of cache misses in the first cache drive surpasses the first threshold, adjust a first allocation of the first cache drive for use in support of read operations and adjusting a second allocation of the first cache drive for use in support of write operations.

In additional vSAN system embodiments, the cache drive of each disk group comprises a solid-state drive and the plurality of capacity storage drives of each disk group comprise magnetic hard disk drives. In additional vSAN system embodiments, the virtual cache adheres to a fixed ratio of cache allocation capacities utilized by the vSAN system. In additional vSAN system embodiments, the fixed cache allocation ratio utilized by the vSAN system comprises utilizing seventy percent of the cache capacity to support read operations and utilizing thirty percent of the cache capacity to support write operations. In additional vSAN system embodiments, the adjustments of the first allocation of the first cache drive in support of read operations comprises allocating no less than sixty percent of the cache capacity of the first cache drive for read operations. In additional vSAN system embodiments, the storage controllers are further configured to adjust a cache allocation ratio in a second cache drive of a second disk group to compensate for the adjustments to the cache allocations in the first cache drive, wherein the second cache drive of the second disk group is selected based on monitoring of cache drive misses in the second cache drive by the storage controllers.

In various additional embodiments, IHSs support a vSAN (virtual Storage Area Network) system and may include: a plurality of storage drives, wherein the storage drives are logically grouped into a plurality of disk groups, wherein each disk group comprises a cache drive and a plurality of capacity storage drives; and a plurality of storage controllers implementing a virtual cache layer that is backed by the cache drives of the plurality of disk groups, wherein the virtual cache layer is configured for use by the vSAN system as a single logical cache in support of read and write operations directed at the plurality of disk groups, and wherein the storage controllers are configured to: monitor cache misses by the cache drives of each of the disk groups during operation of the virtual cache by the vSAN system; detect a number of cache misses above a first threshold in a first cache drive of a first disk group; and if the number of cache misses in the first cache drive surpasses the first threshold, adjust a first allocation of the first cache drive for use in support of read operations and adjusting a second allocation of the first cache drive for use in support of write operations.

In additional IHS embodiments, the virtual cache adheres to a fixed ratio of cache allocation capacities utilized by the vSAN system. In additional IHS embodiments, the fixed cache allocation ratio utilized by the vSAN system comprises utilizing seventy percent of the cache capacity to support read operations and utilizing thirty percent of the cache capacity to support write operations. In additional IHS embodiments, the adjustments of the first allocation of the first cache drive in support of read operations comprises allocating no less than sixty percent of the cache capacity of the first cache drive for read operations. In additional IHS embodiments, the second controllers are further configured to adjust a cache allocation ratio in a second cache drive of a second disk group to compensate for the adjustments to the cache allocations in the first cache drive, wherein the second cache drive of the second disk group is selected based on monitoring of cache drive misses in the second cache drive by the storage controllers.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. It should be appreciated that although certain IHSs described herein may be discussed in the context of enterprise computing servers, other embodiments may be utilized.

As described, in a data center environment, a server IHS may be installed within a chassis, in some cases along with other similar server IHSs. Such servers IHSs may utilize pooled data center resources, such as pools of storage drives installed within a logical cluster of IHSs. Such pools of storage drives may be virtualized and utilized by software applications operating within virtualized software environments, such as vSANs, that run on a server IHS. In particular, pooled storage drives may be organized into disk groups, where each disk group may be utilized by a vSAN as a single logical storage drive. In order to improve the performance of these disk groups, one of the drives of a group may be designated for use as a read and write buffer for storage operations that are directed at the remaining drives of the disk group that are configured to provide permanent storage. These cache drives reduce the latency that would otherwise be required for each read and write operation to be completed by the permanent storage drives. However, with each cache miss, this latency is not avoided. As such, the efficiency improvements provided by the use of disk groups is dependent on the percentage of storage operations that are completed without cache misses.

Figure 1:
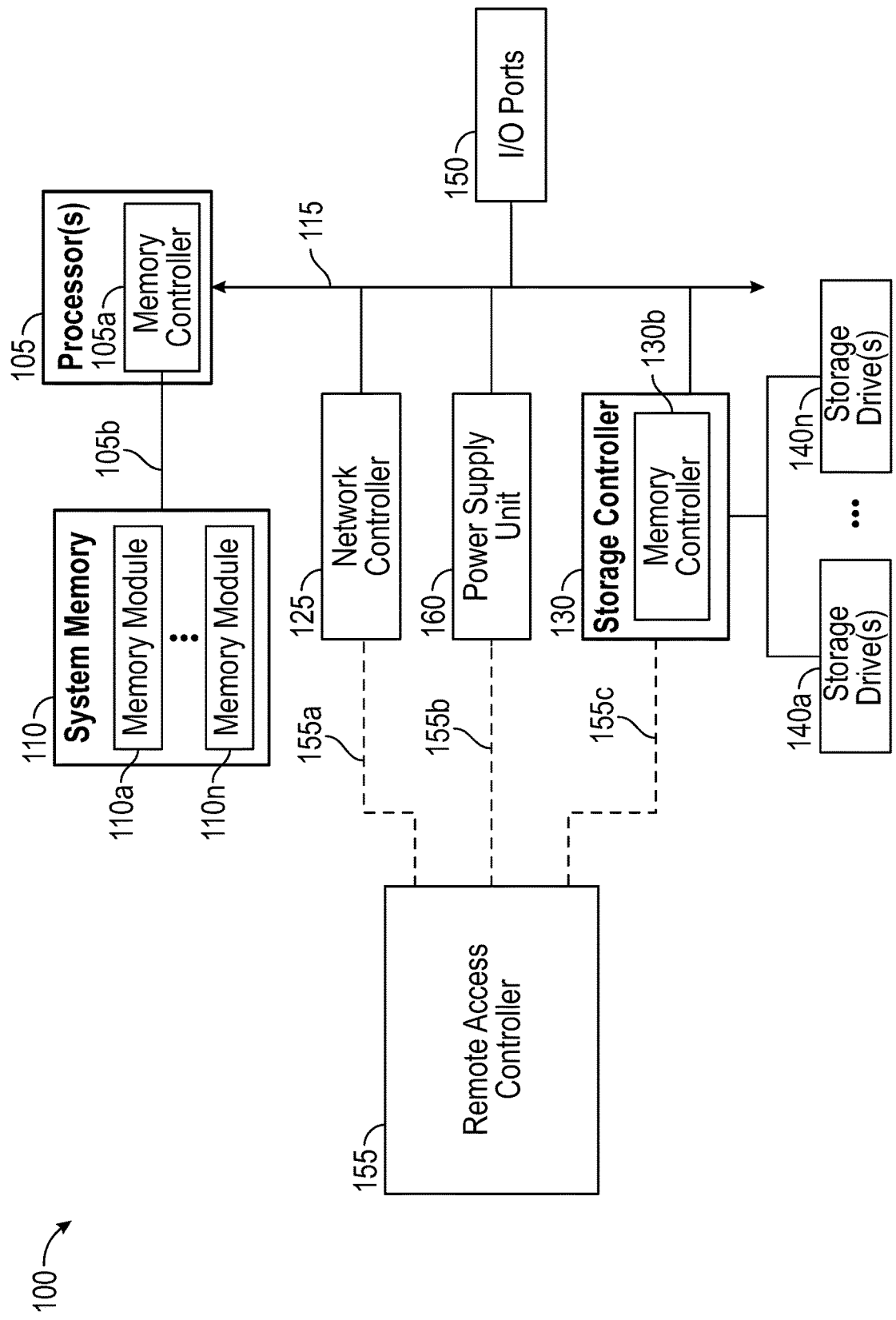
FIG. 1 is a block diagram illustrating certain components of an IHS configured according to various embodiments to support an aggregated vSAN cache that supports a dynamic read and write cache.

FIG. 1 illustrating certain components of an IHS 100 configured according to various embodiments to support an aggregated vSAN cache that supports a dynamic read and write cache. Although the embodiments provided herein describe an IHS that is a rack-mounted server, other embodiments may be implemented using other types of IHSs. In the illustrative embodiment of FIG. 1, IHS 100 may be a server that would typically be installed within a chassis, that in turn would be typically installed within slots of a rack. Installed in this manner, IHS 100 may utilize certain shared resources provided by the chassis and/or rack, such as power and networking. In some embodiments, multiple servers such as IHS 100 may be installed within a single chassis. For instance, IHS 100 may be a 1 RU (Rack Unit) server that is paired with a similar 1 RU component, such as another server similar to IHS 100, and may be installed with a 2 RU chassis.

IHS 100 may include one or more processors 105. In some embodiments, processors 205 may include a main processor and a co-processor, each of which may include a plurality of processing cores. As illustrated, processor(s) 105 may include an integrated memory controller 105a that may be implemented directly within the circuitry of the processor 105, or the memory controller 105a may be a separate integrated circuit that is located on the same die as the processor 105. The memory controller 105a may be configured to manage the transfer of data to and from the system memory 110 of the IHS 105 via a high-speed memory interface 105b.

System memory 110 may include memory components, such as such as static RAM (SRAM), dynamic RAM (DRAM), NAND Flash memory, suitable for supporting high-speed memory operations by the processor(s) 105. System memory 110 may combine both persistent, non-volatile memory and volatile memory. In certain embodiments, the system memory 110 may be comprised of multiple removable memory modules. The system memory 110 of the illustrated embodiment includes removable memory modules 110a-n. Each of the removable memory modules 110a-n may utilize a form factor corresponding to a motherboard expansion card socket that receives a type of removable memory module 110a-n, such as a DIMM (Dual In-line Memory Module). Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may operate using a chipset that may be implemented by integrated circuits that couple processor 105 to various other components of the motherboard of IHS 100. In some embodiments, all or portions of the chipset may be implemented directly within the integrated circuitry of an individual processor 105. The chipset may provide the processor(s) 105 with access to a variety of resources accessible via one or more buses 115. Various embodiments may utilize any number of buses to provide the illustrated pathways provided by the single illustrated bus 115. In certain embodiments, bus 115 may include a PCIe (PCI Express) switch fabric that is accessed via a root complex and coupled processor 105 to a variety of internal and external PCIe devices.

In various embodiments, a variety of resources may be coupled to the processor(s) 105 of the IHS 100 via buses 115 managed by the processor chipset. In some cases, these resources may be components of the motherboard of IHS 100 or these resources may be resources coupled to IHS 100, such as via I/O ports 150. In some embodiments, IHS 100 may include one or more I/O ports 150, such as PCIe ports, that may be used to couple the IHS 100 directly to other IHSs, storage resources or other peripheral components. In certain embodiments, the I/O ports 150 may provide couplings to a backplane or midplane of the chassis in which the IHS 100 is installed. In some instances, I/O ports 150 may include rear-facing externally accessible connectors by which external systems and networks may be coupled to IHS 100.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may additionally implement a variety of management capabilities. In some instances, remote access controller 155 operate from a different power plane from the processors 105, storage drives 140a-n and other components of IHS 100, thus allowing the remote access controller 155 to operate, and management tasks to proceed, while the processing cores of IHS 100 are powered off. Various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

As illustrated, IHS 100 may also include a power supply unit 160 that provides the components of the chassis with appropriate levels of DC power. The power supply unit 160 may receive power inputs from an AC power source or from a shared power system that is provided by a rack within which IHS 100 may be installed. In certain embodiments, power supply unit 160 may be implemented as a swappable component that may be used to provide IHS 100 with redundant, hot-swappable power supply capabilities. As illustrated, power supply unit 160 may include a sideband management connection 155b with remote access controller 155. Based on inputs provided by this sideband management connection 155b, power supply unit 160 may implement various power modes that may be remotely monitored and managed.

As illustrated, processor(s) 105 may also be coupled to a network controller 125, such as provided by a Network Interface Controller (NIC) that is coupled to the IHS 100 and allows the IHS 100 to communicate via an external network, such as the Internet or a LAN. Network controller 125 may include various microcontrollers, switches, adapters, and couplings used to connect IHS 100 to a network, where such connections may be established by IHS 100 directly or via shared networking components and connections provided by a rack in which chassis 100 is installed. In some embodiments, network controller 125 may allow IHS 100 to interface directly with network controllers from other nearby IHSs in support of clustered processing capabilities that utilize resources from multiple IHSs. As with power supply unit 160, network controller 125 may include a sideband management connection 155a with remote access controller 155, where this sideband connection 155a may be used for remote monitoring and management of the network controller's operations.

IHS 100 may include one or more storage controllers 130 that may be utilized to access storage drives 140a-n that are accessible via the chassis in which IHS 100 is installed, and, in some cases, to access remote storage drives installed in other chassis that may be within the same rack or in a different rack of a data center. Although a single storage controller 130 is illustrated in FIG. 1, IHS 100 may include multiple storage controllers that may be configured identically or in different configurations. As described in additional detail below, in some embodiments, the storage drives 140a-n may be logically grouped into disk groups, where each group may be utilized as a single logical storage drive. Some disk groups may be hybrid disk groups that include both solid-state drives (SDDs) and magnetic hard-disk drives (HDDs). In such hybrid disk groups, the SDD may be used as a cache drive and the HDDs may be used for permanent data storage. In a vSAN configuration, multiple such disk groups available within a cluster of IHSs may be collectively utilized to provide a storage solution supporting large storage capacities, high availability and data redundancy to applications operating within virtualized operating environments. In support of these capabilities, embodiments may utilize a virtual cache layer that aggregates the caching resources available within all of the disk groups of a cluster.

In some embodiments, a storage controller 130 of IHS 100 may provide support for RAID (Redundant Array of Independent Disks) configurations of logical and physical storage drives 140a-n. In some embodiments, a storage controller 155 of IHS 100 may be an HBA (Host Bus Adapter) that provides more limited capabilities in accessing physical storage drives 140a-n. In many embodiments, storage drives 140a-n may be replaceable, hot-swappable storage devices that are installed within bays provided by the chassis in which IHS 100 is installed. In some embodiments, storage drives 140a-n may also be accessed by other IHSs that are also installed within the same chassis as IHS 100. For instance, when installed within a 2 RU chassis, IHS 100 may be a 1 RU component of the chassis that is able to access storage drives 140a-n along with another 1 RU IHS that is also installed within a slot of the 2 RU chassis. In embodiments where storage drives 140a-n are hot-swappable devices that are received by bays of chassis, the storage drives 140a-n may be coupled to IHS 100 by connectors provided by the individual bays to a midplane of IHS 100. In various embodiments, storage drives 140a-n may include SAS (Serial Attached SCSI) magnetic disk drives, SATA (Serial Advanced Technology Attachment) magnetic disk drives, solid-state drives (SSDs) and other types of storage drives in various combinations. As with processor(s) 105, storage controller 130 may also include an integrated memory controller 130b that may be used to manage the transfer of data to and from caches, such as described below.

As with power supply unit 160 and network controller 125, storage controller 130 may include a sideband management connection 155c with remote access controller 155, where this sideband connection 155c may be used for remote monitoring and management of the storage controller's operations. For instance, as described in additional detail below, remote access controller 155 may utilize sideband connection 155c for configuring aspects of the dynamic allocation of read and write cache ratios within logical disk groups that have been designated among storage drives 140a-n. In particular, remote access controller 155 may monitor the read and write cache ratio allocations in use by storage controller 130 in providing remote management of these capabilities and providing remote management inputs to storage controller 130 for use in the selection of read and write cache ratios.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

Figure 2:
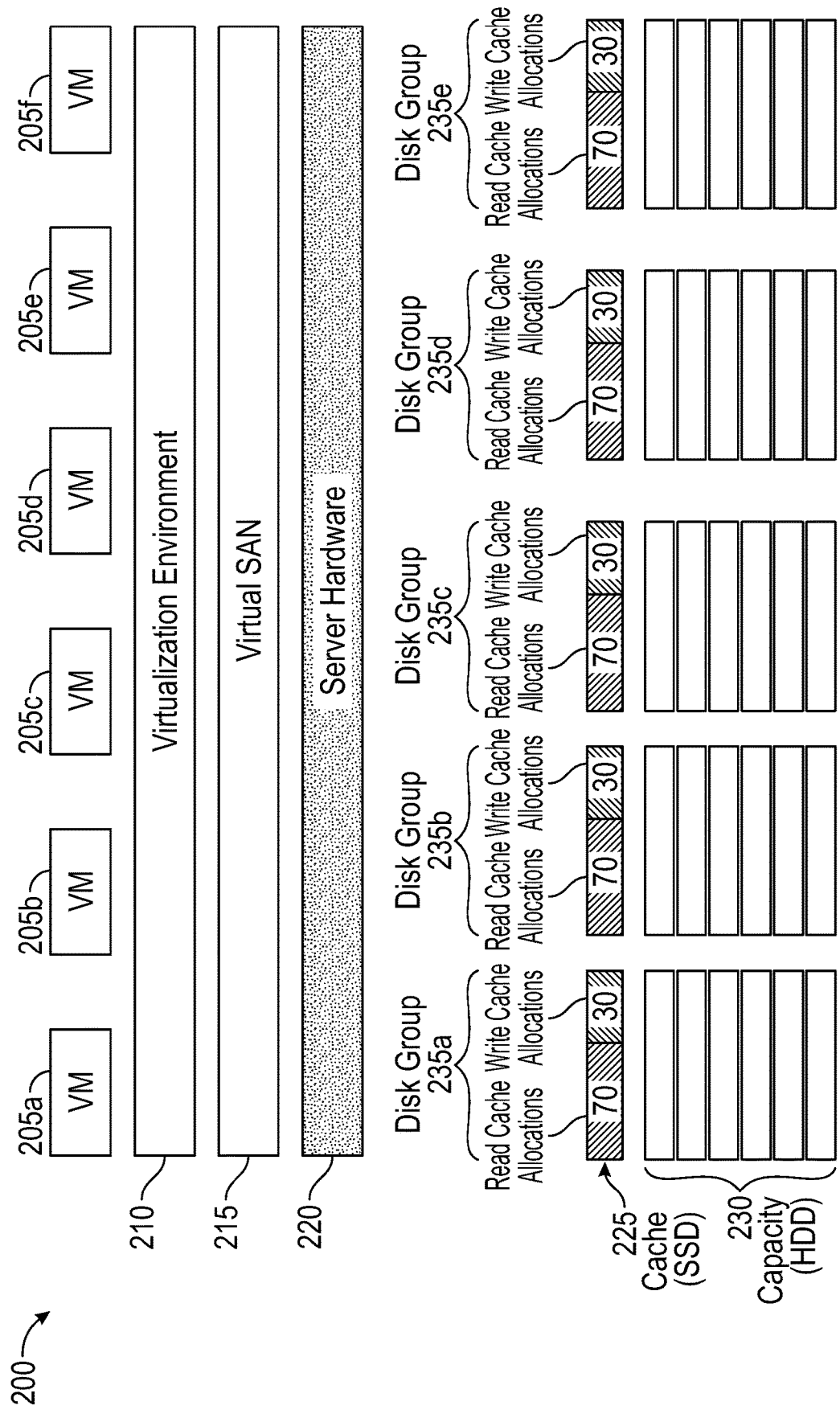
FIG. 2 is a block diagram illustrating certain components of an existing vSAN system utilizing a collection of fixed disk group caches.

FIG. 2 is a block diagram illustrating certain components of an existing vSAN system 200 utilizing a collection of fixed disk group caches. In the existing vSAN system of FIG. 2, a set of virtual machines 205a-f operate within a virtualized operating environment 210. Operating within virtualized environment 210, the virtual machines 205a-f may provide a variety of processing capabilities in which the underlying hardware of the system is abstracted through logical representations provided by the virtualized environment 210. For example, the virtual machines 205a-f may utilize storage resources that are managed by a vSAN 215 software application that is accessed by the virtual machines 205a-f through the virtualized environment 210. The vSAN 215 software provides the virtual machines 205a-f with logical representations of the storage resources that are available via the underlying server hardware 220.

As illustrated, the storage resources of the server hardware 220 include five separate disk groups 235a-e. As described, a vSAN system 200 may employ logical groups of storage drives that may be available within the hardware of a single server 220, or within the hardware of a cluster of servers. Each disk group 235a-e may be managed by the vSAN 215 as a single storage volume. Accordingly, each disk group 235a-e serves as a pooled collection of storage drives that is represented as one logical storage entity. As illustrated, the disk groups 235a-e of the existing vSAN system 200 are each comprised of a cache drive 225 and a collection of capacity drives 230. In the hybrid disk groups 235a-e of the existing vSAN system 200, the cache drives 225 are solid-state drives and the capacity drives 230 are magnetic hard drives.

Using such hybrid disk group configurations, faster but more expensive solid-state drives may be used for cache operations and slower but cheaper hard-disk drives may be used for the bulk storage operations of the capacity layer. However, the efficiency gains provided by use of a dedicated cache drive are limited by the number of storage operations that can be completed without a cache miss. With each cache miss, high-latency capacity layer storage operations are required. When utilizing a disk group with a dedicated cache drive, existing vSAN applications 215 typically require partitioning the cache drive into a portion for use in support of read operations and a separate portion for use in support of write operations. As indicated in FIG. 2, existing vSAN applications 215 commonly operate using cache drive allocations in which 70 percent of the cache drive capacity is reserved for use in support of read operations and the remaining 30 percent of the cache drive capacity is reserved for write operations.

Although this ratio of cache drive allocations may be suitable for some scenarios, there are many other scenarios in which this ratio is not optimal. For instance, when in use, a vSAN system may be characterized by intervals where storage operations are predominantly read operations or write operations. For instance, during a vSAN operation in which a snapshot is being taken of a database, almost all of the storage operations may be read operations. Conversely, during a bulk import vSAN operation, almost all of the storage operations may be write operations. Accordingly, the use of fixed cache allocation ratios can lead to a significant number of cache misses during certain intervals of operation. Additionally, in existing systems such as illustrated in FIG. 2, cache misses may result from the use of the same cache allocation ratio for every disk group within the vSAN system. As described, certain vSAN operations may involve storage operations that are predominantly read operations or predominantly write operations. In some instances, these operations may not be balanced equally amongst all of the disk groups. In such scenarios, a fixed cache drive allocation may be particularly ill-suited to certain disk groups that are being disproportionately used in these operations. Accordingly, embodiments provide a capability for dynamically adjusting cache memory allocations for individual disk groups while still adhering to use of fixed cache allocation ratios by existing vSAN applications 215.

Figure 3:
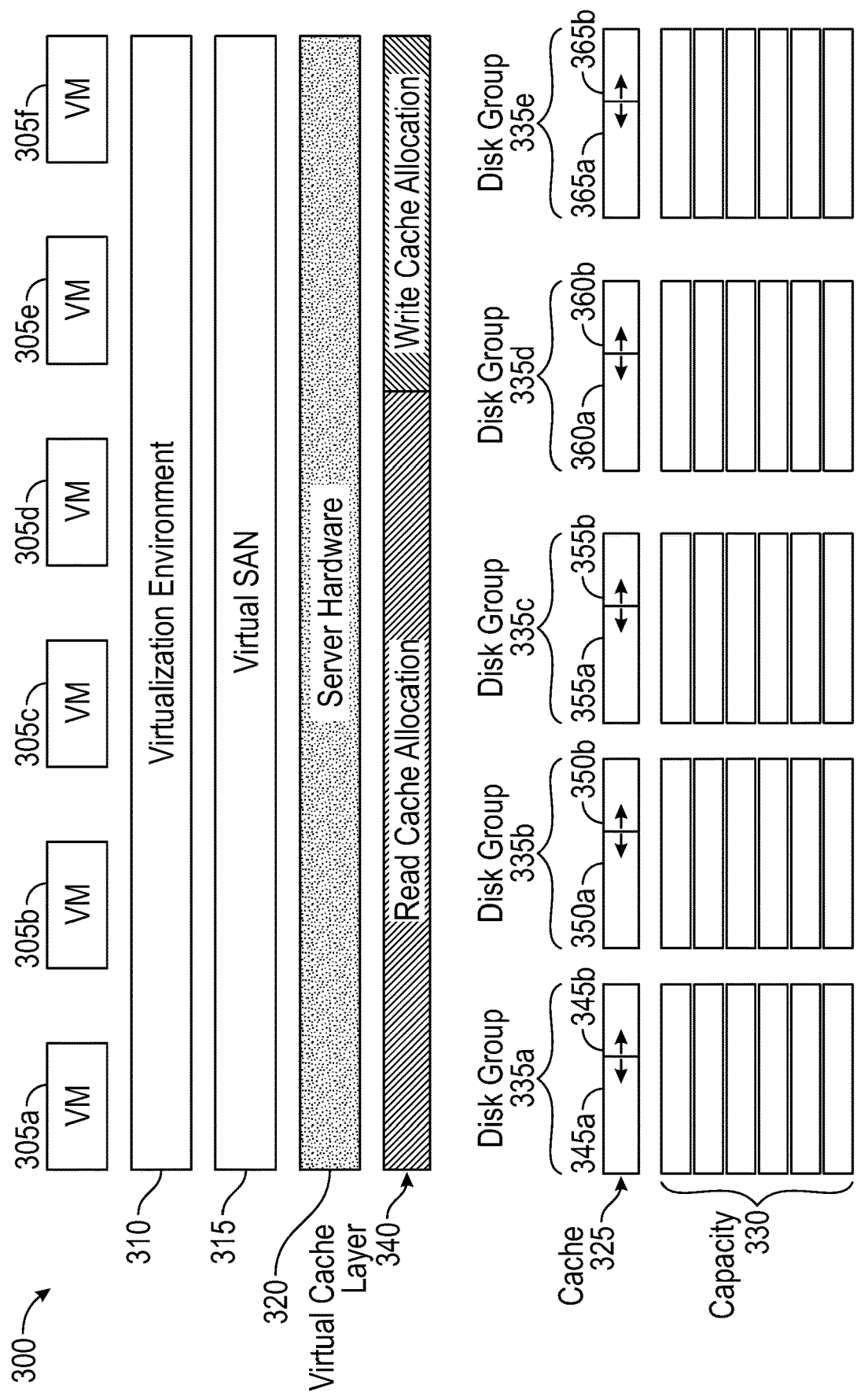
FIG. 3 is a block diagram illustrating certain components of a vSAN system configured according to various embodiments to support an aggregated vSAN cache layer that supports dynamic read and write ratios.

FIG. 3 is block diagram illustrating certain components of a vSAN system 300 configured according to various embodiments to support an aggregated vSAN cache layer 340 that supports dynamic read and write ratios. As illustrated, vSAN system 300 embodiments support multiple virtual machines 305a-f that operate within a virtualized operating environment 310. The virtual machines 305a-f provide independent execution spaces in which applications may operate in virtual isolation while sharing the same underlying server hardware 320, such as the hardware of server IHS embodiments described with regard to FIG. 1. The virtual machines 305a-f may be utilized in supporting a wide variety of computing applications that may range from personal use to enterprise support for commercial and scientific activities. Operating within the virtualized environment 310, the virtual machines 305a-f may utilize storage resources provided by vSAN 315. As described, a vSAN 315 provides use of storage capabilities within a virtualized environment 310, where the storage capabilities are provided in the virtualized environment 310 as logical abstractions, while the vSAN 315 interoperates with the physical storage capabilities that are provided via server hardware 320.

As illustrated, the storage resources utilized by vSAN 315 include disk groups 335a-e, where each of the disk groups 335a-e includes a dedicated cache drive 325 and a collection of capacity drives 330. In many embodiments, the dedicated cache drives 325 of each disk group may be implemented using solid-state drives and the capacity drives 330 of each disk group may be implemented using hard disk drives. Such configurations utilize more expensive and faster solid-state drives to support caching, while utilizing slower and cheaper hard disk drives for permanent storage capacity. As described, the efficiency of such configurations is limited by the number of cache misses that result from storage operations that cannot be completed by cache drives 325 and require higher latency capacity drive 330 operations.

In providing improved caching efficiency, embodiments provide the vSAN application 315 with use of a virtual cache layer 340 that aggregates the caching capacity of each of the cache drives 325 from each disk group 335a-e. As described, some vSAN systems enforce fixed cache allocation ratios, such as dedicating 70 percent of available caching capacity for read operations and dedicating the remaining 30 percent of available caching capacity for write operations. Accordingly, embodiments support the use of such fixed caching allocation ratios in the virtual cache layer 340. However, embodiments may adjust the cache allocation ratios that are used by each of the individual cache drives 325 in each of the disk groups 335a-e. As described in additional detail with regard to FIG. 4, the number and type of cache misses by each of the individual cache drives 325 may be monitored. In some embodiments, such monitoring of cache misses in disk group may be implemented by a storage controller managing that disk group, such as described with regard to FIG. 1.

Based on the monitoring of cache misses in each of the disk groups 335a-e, the cache ratio allocation of each individual cache drives 325 may be adjusted. For instance, if a series of bulk read operations result in an increasing number of read cache misses in the cache drive of disk group 335a, the size of the read cache allocation 345a of this cache drive may be increased and the size of the write cache allocation 345b may be decreased accordingly. In scenarios where the overall cache ratio allocation of the virtual cache layer 340 must remain fixed to comply with vSAN system 315 requirements, this cache allocation adjustment in disk group 335a may be compensated by adjusting the cache allocation ratio in another disk group 335b-e. In some embodiments, such cache allocation adjustments may be determined based on the observed cache miss ratios in the other disk groups 335b-e. For instance, if the cache drive of disk group 335b is operating with a minimal number of read cache misses, the read cache allocation 350a of this cache drive may be decreased and the size of the write cache allocation 350b may be increased, thus preserving the fixed cache allocation ratio that is provided by the virtual cache layer 340.

Figure 4:
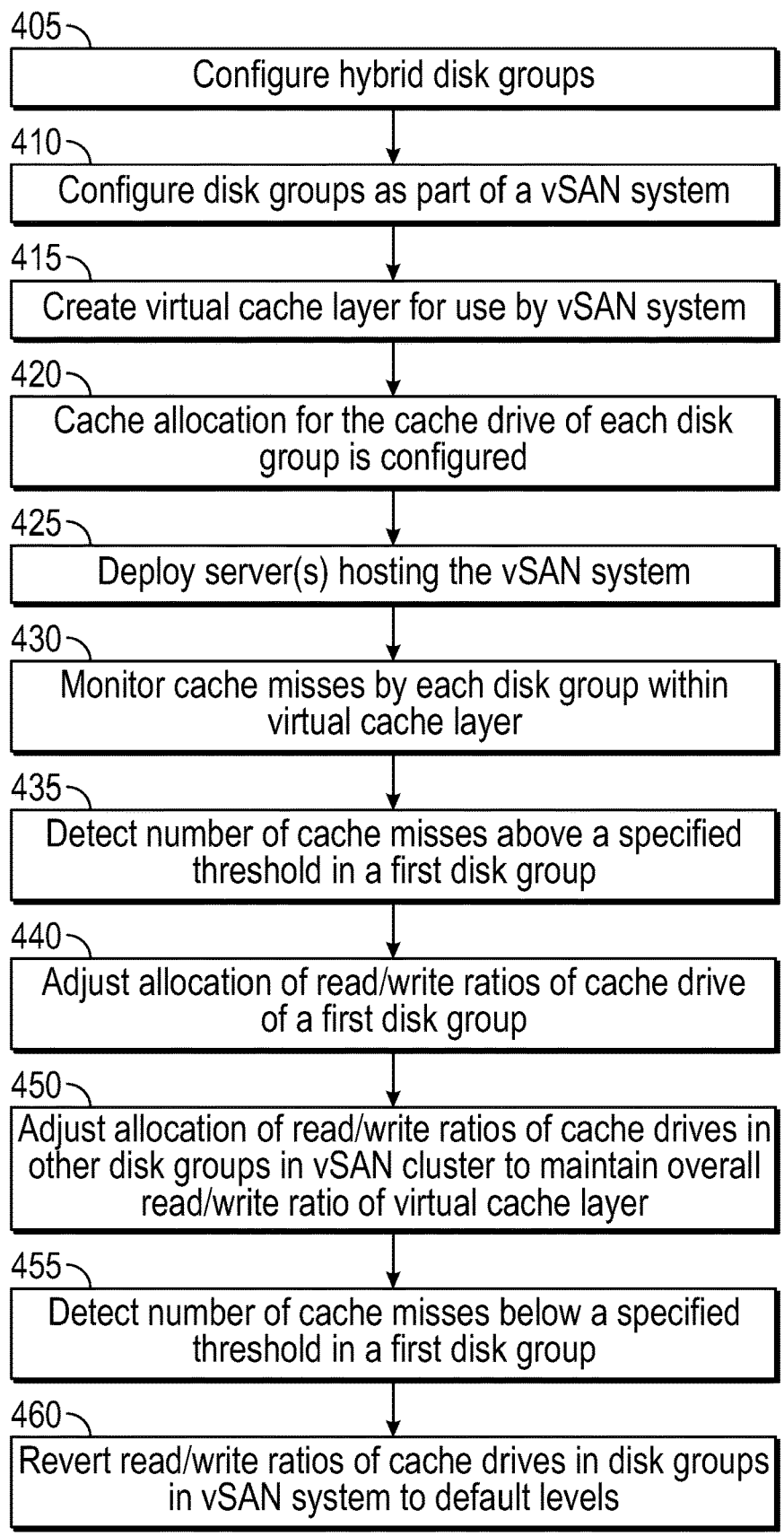
FIG. 4 is a flowchart diagram illustrating certain steps of a method according to various embodiments for supporting an aggregated vSAN cache that supports dynamic read and write ratios.

FIG. 4 is a flowchart diagram illustrating certain steps of a method according to various embodiments for supporting an aggregated vSAN cache that supports dynamic read and write ratios. In configuring a vSAN system such as described with regard to FIG. 3, embodiments may begin at block 405 with the configuration of hybrid disk groups including a dedicated solid-state drive dedicated for caching operations and a collection of hard disk drives used for permanent storage capacity. In many embodiments, all storage drives that comprise a disk group will be installed within the same server IHS or within a single chassis that houses multiple IHSs, such as a 2 RU chassis that houses two individual 1 RU server IHSs. At block 410, the disk groups are configured as members of a vSAN system. In some embodiments, all of the disk groups configured for use by a vSAN system may be accessed using a single server and in other embodiments, the disk groups configured for use may be distributed among a logical cluster of servers that are part of the vSAN system.

As described, embodiments provide a vSAN system with use of a virtual cache layer. At block 415, the dedicated cache drives of each disk group are configured for use in implementing the virtual cache layer that is provided for use by the vSAN system. In some embodiments, at block 420, the cache allocation for each of the dedicated cache drives in use by the virtual cache layer may be configured. In some instances, the cache allocation for each dedicated cache drive may be configured according to the default cache allocation used by the vSAN system. However, in other instances, the cache allocations for each dedicated cache drive maybe individually determined based on various criteria. For instance, in a disk group assigned for use in supporting database replicas, the cache drive for that disk group may be configured with a larger write cache allocation than the default cache allocation ratio. In another example, for disk group assigned for use in supporting distribution of relatively static Internet content, such as certain web content, the cache drive for that disk group may be configured with a larger read cache allocation than the default cache allocation ratio. Upon being configured, at block 425, the servers hosting the vSAN system may be put into operation and the vSAN system may be deployed.

As described, upon a vSAN system according to embodiments being put into operation, at block 430, the number and type of cache misses in each disk group of the vSAN system is monitored. For instance, a storage controller that manages the storage operations of a disk group may monitor the number of read cache misses and the number of write cache misses by the dedicated cache drive of this disk group. Based on such monitoring of cache misses, at block 435, an increase in the number of cache misses above a specified threshold may be detected. For example, a storage controller monitoring cache misses or a disk group may detect a number of read cache misses that exceeds 20 percent of the read operations received for that disk group. With such a high percentage of cache misses, the overall efficiency of the disk group's operation is reduced due to the need for a significant number of high-latency capacity disk read operations. In some embodiments, the thresholds utilized by a storage controller in making such determinations may be received from a remote access controller, such as via the sideband communications described with regard to FIG. 1. Upon detecting such cache miss conditions in a disk group, at block 440, the cache allocation ratios for that disk group may be adjusted. If a large number of read cache misses has been detected in a disk group, the cache allocation ratio for that disk group may be adjusted to provide a larger read cache allocation. Conversely, if a large number of write cache misses has been detected, the cache allocation ratio may be adjusted to provide a larger write cache allocation. In some embodiments, the size of the cache allocation ratio adjustments may be proportional to the number of cache misses that have been detected.

In some embodiments, at block 450, the adjustment of a cache allocation in one disk group of the vSAN system may result in a compensating adjustment of a cache allocation in another disk group of the vSAN system in order to maintain the overall disk group allocation provided to the vSAN system via the virtual cache layer. As described, such compensating adjustments may be made based on the number and type cache misses that are currently being observed in each of the disk groups. For example, a cache drive that is currently demonstrating a low number of cache misses and/or a low number of storage operations may be selected for a compensating cache allocation adjustment over another cache drive that is demonstrating a higher number of cache misses and/or a heavy workload of storage operations. In this manner, the cache allocation policies enforced by the vSAN system may be supported, while optimizing the cache allocation ratios in use by the individual disk groups based on the storage operations that are actually being executed by the individual disk groups. In some embodiments, the selection of a cache drive for a compensating cache allocation adjustment may be based on a RAID level that is supported by the disk group of that cache drive. In typical RAID scenarios, all of the storage drives of a disk group are configured to support the same RAID level. The various RAID levels that may be supported my implement different levels of redundancy, which may result in increased latency in storage operations in certain disk groups, such as disk group configured for RAID 6 operations compared to a disk group implementing RAID 0 operations. In a scenario where the disk groups of a vSAN system include disk groups configured for RAID 6 and RAID 0 operations, the cache drive of a disk group supporting RAID 0 level operations may be selected for compensating cache allocation adjustments, thus avoiding the high-latency RAID 6 operations that may result from cache misses by the cache drive of a RAID 6 disk group.

Utilizing the ongoing monitoring of cache misses in each of the disk groups, at block 455, a number of cache misses below a specified threshold may be detected in a cache drive that has been configured with an adjusted cache ratio allocation. For instance, in a scenario where read operation cache misses are detected as falling below five percent of overall read operations within a cache drive that has been adjusted to utilize 80 percent of the cache drive capacity in support of read operations, at block 460, the cache allocation ratio for that cache drive may be reverted to the default cache allocation ratio utilized by the vSAN system.

The described adjustments of cache allocation ratios based on the monitored cache misses provided by embodiments has been demonstrated to result in improved cache efficiency. As described, vSAN operations may be characterized by periods of imbalances in the number of read operations and write operations received by cache drives, where such imbalances may be disproportionally directed at some of the disk groups used by the vSAN system, thus resulting in significant numbers of cache misses in these disk groups. The compensations provided by embodiments provide a dynamic response to such imbalances, but the inventors have recognized that the described adjustments of cache allocations should be limited in order to avoid overcompensating for the detected imbalances. For instance, a vSAN system may be designed to operate using a fixed cache allocation ratio where 70 percent of the cache capacity is reserved for use in read operations and the remaining 30 percent of the cache capacity is used for write operations. The inventors have recognized that improved caching efficiency can be provided when a virtual cache layer is provided that adheres to this cache allocation ratio, but the cache allocation ratios of the underlying cache drives are adjusted in response to the detected numbers of cache misses by the individual cache drives. However, such adjustments in the cache allocation ratios used in the underlying cache drives should be limited to remain within ten percent of the cache allocation ratio being provided to the vSAN system by the virtual cache layer.

For instance, in the described vSAN system using the described 70/30 cache allocation ratio, the adjustments to the read cache allocation of an underlying cache drive should not exceed 80 percent of the available cache capacity and should not drop below 60 percent of the available cache capacity. Accordingly, the write cache allocation should remain between 20 and 40 percent of the available cache capacity. By remaining within these bounds, the inventors have demonstrated that improved caching efficiency can be provided, while allowing the virtual cache layer to continue providing the fixed cache allocation ratio to the vSAN system and avoiding scenarios where large numbers of cache misses result from adjustments that overcompensate for the detected number of cache misses.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for use in a vSAN (virtual Storage Area Network) system compromising a plurality of disk groups, wherein each disk group comprises a cache drive and a plurality of capacity storage drives, the method comprising:
    configuring a virtual cache that is backed by the cache drives of the plurality of disk groups;
    configuring the vSAN system for use of the virtual cache as a single logical cache in support of read and write operations directed at the plurality of disk groups of the vSAN system;
    monitoring cache misses by the cache drives of each of the disk groups during operation of the virtual cache by the vSAN system;
    detecting a number of cache misses above a first threshold in a first cache drive of a first disk group; and
    if the number of cache misses in the first cache drive surpasses the first threshold, adjusting a first allocation of the first cache drive for use in support of read operations and adjusting a second allocation of the first cache drive for use in support of write operations.

2. The method of claim 1, wherein the cache drive of each disk group comprises a solid-state drive and the plurality of capacity storage drives of each disk group comprise magnetic hard disk drives.

3. The method of claim 1, wherein the vSAN system utilizes a fixed ratio of read cache allocation capacity and write cache allocation capacity.

4. The method of claim 3, wherein the virtual cache adheres to the fixed ratio of cache allocation capacities.

5. The method of claim 4, wherein the fixed cache allocation ratio utilized by the vSAN system comprises utilizing seventy percent of the cache capacity to support read operations and utilizing thirty percent of the cache capacity to support write operations.

6. The method of claim 5, wherein the adjustments of the first allocation of the first cache drive in support of read operations comprises allocating no less than sixty percent of the cache capacity of the first cache drive for read operations.

7. The method of claim 5, wherein the adjustments of the first allocation of the first cache drive in support of write operations comprises allocating no more than eighty percent of the cache capacity of the first cache drive for read operations.

8. The method of claim 1, further comprising:
    if the number of cache misses in the first cache drive surpasses the first threshold, adjusting a cache allocation ratio in a second cache drive of a second disk group to compensate for the adjustments to the cache allocations in the first cache drive.

9. The method of claim 8, wherein the second cache drive of the second disk group is selected based on monitoring of cache drive misses in the second cache drive.

10. A vSAN (virtual Storage Area Network) system comprising:
    a plurality of disk groups, wherein each disk group comprises a cache drive and a plurality of capacity storage drives;
    a virtual cache layer that is backed by the cache drives of the plurality of disk groups, wherein the virtual cache layer is configured for use by the vSAN system as a single logical cache in support of read and write operations directed at the plurality of disk groups; and
    a plurality of storage controllers configured to:
        monitor cache misses by the cache drives of each of the disk groups during operation of the virtual cache by the vSAN system;
        detect a number of cache misses above a first threshold in a first cache drive of a first disk group; and
        if the number of cache misses in the first cache drive surpasses the first threshold, adjust a first allocation of the first cache drive for use in support of read operations and adjust a second allocation of the first cache drive for use in support of write operations.

11. The vSAN system of claim 10, wherein the cache drive of each disk group comprises a solid-state drive and the plurality of capacity storage drives of each disk group comprise magnetic hard disk drives.

12. The vSAN system of claim 10, wherein the virtual cache adheres to a fixed ratio of cache allocation capacities utilized by the vSAN system.

13. The vSAN system of claim 12, wherein the fixed cache allocation ratio utilized by the vSAN system comprises use of seventy percent of the cache capacity to support read operations and utilizing thirty percent of the cache capacity to support write operations.

14. The vSAN system of claim 13, wherein the adjustments of the first allocation of the first cache drive in support of read operations comprises an allocation of no less than sixty percent of the cache capacity of the first cache drive for read operations.

15. The vSAN system of claim 10, wherein the storage controllers are further configured to adjust a cache allocation ratio in a second cache drive of a second disk group to compensate for the adjustments to the cache allocations in the first cache drive, wherein the second cache drive of the second disk group is selected based on monitoring of cache drive misses in the second cache drive by the storage controllers.

16. An IHS (Information Handling System) supporting a vSAN (virtual Storage Area Network) system, the IHS comprising:
a plurality of storage drives, wherein the storage drives are logically grouped into a plurality of disk groups, wherein each disk group comprises a cache drive and a plurality of capacity storage drives; and
a plurality of storage controllers implementing a virtual cache layer that is backed by the cache drives of the plurality of disk groups, wherein the virtual cache layer is configured for use by the vSAN system as a single logical cache in support of read and write operations directed at the plurality of disk groups, and wherein the storage controllers are configured to:
monitor cache misses by the cache drives of each of the disk groups during operation of the virtual cache by the vSAN system;
detect a number of cache misses above a first threshold in a first cache drive of a first disk group; and
if the number of cache misses in the first cache drive surpasses the first threshold, adjust a first allocation of the first cache drive for use in support of read operations and adjusting a second allocation of the first cache drive for use in support of write operations.

17. The IHS of claim 16, wherein the virtual cache adheres to a fixed ratio of cache allocation capacities utilized by the vSAN system.

18. The IHS system of claim 17, wherein the fixed cache allocation ratio utilized by the vSAN system comprises use of seventy percent of the cache capacity to support read operations and utilizing thirty percent of the cache capacity to support write operations.

19. The IHS system of claim 18, wherein the adjustments of the first allocation of the first cache drive in support of read operations comprises an allocation of no less than sixty percent of the cache capacity of the first cache drive for read operations.

20. The IHS system of claim 16, wherein the second controllers are further configured to adjust a cache allocation ratio in a second cache drive of a second disk group to compensate for the adjustments to the cache allocations in the first cache drive, wherein the second cache drive of the second disk group is selected based on monitoring of cache drive misses in the second cache drive by the storage controllers.

* * * * *